United States Patent [19]

Horiguchi

[11] Patent Number: 5,106,887
[45] Date of Patent: Apr. 21, 1992

[54] NON-ASBESTOS FRICTION MATERIAL

[75] Inventor: Kazuya Horiguchi, Hanyu, Japan

[73] Assignee: Akebono Brake Industry Co., Ltd., Tokyo, Japan

[21] Appl. No.: 651,300

[22] Filed: Feb. 5, 1991

[30] Foreign Application Priority Data

Feb. 14, 1990 [JP] Japan .................................. 2-33179

[51] Int. Cl.$^5$ ................................................ C08K 3/34
[52] U.S. Cl. ...................................... 523/155; 523/156
[58] Field of Search .................................. 523/155, 156

[56] References Cited

U.S. PATENT DOCUMENTS

| 4,374,211 | 2/1983 | Gallagher et al. | 523/156 |
| 4,663,368 | 5/1987 | Harding et al. | 523/155 |
| 4,743,635 | 5/1988 | Nakagawa et al. | 523/155 |
| 4,861,809 | 8/1989 | Ogawa et al. | 523/149 |
| 4,866,107 | 9/1989 | Doxsee et al. | 523/153 |
| 4,895,882 | 1/1990 | Asano et al. | 523/145 |

Primary Examiner—Paul R. Michl
Assistant Examiner—Edward J. Cain
Attorney, Agent, or Firm—Oblon, Spivak, McClelland, Maier & Neustadt

[57] ABSTRACT

The invention relates to a non-asbestos friction material comprising fibrillated acrylic fibers admixed with fibrous base materials selected from glass fibers, heat-resistant organic fibers, inorganic fibers and metallic fibers, said fibrillated acrylic fibers having a freeness (Canadian Standard Freeness) of at least 450 ml, a thermosetting resin and a friction modifier, and a method for production thereof.

6 Claims, 3 Drawing Sheets

NON-ASBESTOS FRICTION MATERIAL

BACKGROUND OF THE INVENTION

The present invention relates to non-asbestos type friction material applicable for various friction materials (pad, lining, clutch facing, brake block, etc.).

So far, for the non-asbestos type friction materials, aramid fibers have been used commonly as organic fibers (example: U.S. Pat. No. 4,374,211). In the case of particularly drum brake lining among them, however, the formulation rate of organic materials becomes higher over that in the case of asbestos type lining, thus a larger torque (initial peak) is prone to generate initially causing a problem of instability of efficiency. Moreover, in the case of non-asbestos type lining, as a substitute for asbestos, a combination of aramid fibers, metallic fibers, inorganic fibers, etc. is used ordinarily for base materials and, because of high content of inorganic materials for the improvement in heat resistance, the noise property is also called into question.

As a result of extensive investigations in view of this situation, a non-asbestos friction material with improved stability of initial efficiency and with improved noise property has been developed by the invention.

SUMMARY OF THE INVENTION

The invention is characterized in that the non-asbestos friction material comprises fibrous base materials combined with fibrillated acrylic fibers having a freeness (Canadian Standard Freeness) of more than 320 ml with at least one kind of fibers selected from glass fibers, heat-resistant organic fibers and inorganic fibers or metallic fibers, a thermosetting resin and a friction modifier.

DETAILED DESCRIPTION OF THE INVENTION

Figure 1:
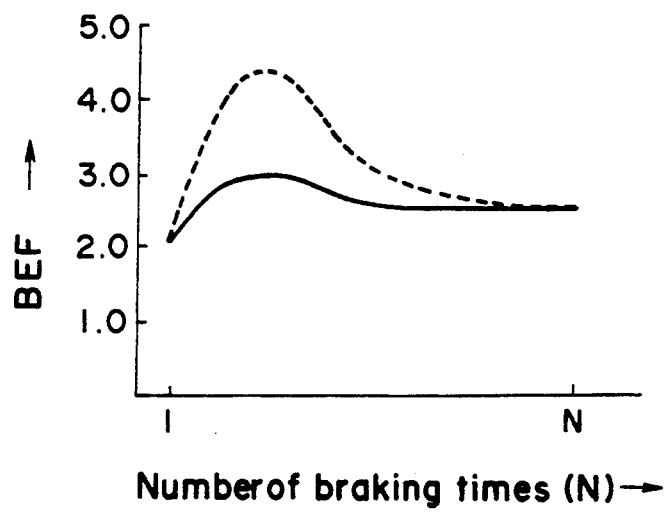
FIG. 1 is a measured diagram showing measurement value of initial torque versus number of braking times of brake.

As described, by using fibrillated acrylic fibers having a freeness of more than 320 ml and relatively low temperature of oxidative decomposition and by combining these with the conditions of heat treatment, it is possible to eliminate the decomposition products and melts generating due to the heat of friction during the production process and to effectively extinguish the initial peak of torque.

Further, through the combined use of said fibrillated acrylic fibers with fibrous base material, the invention has a feature giving the lubricating property by organic fibers and thus improving the noise property.

In following, general raw materials to be used for the friction material of the invention will be shown below.
① Fibrillated acrylic fibers (comprising 100% acrylonitrile and having 320 ml or more freeness).
② Thermosetting resin: Phenol resin or various modified phenol resins.
③ Friction modifier: Cashew dust, rubber dust, barium sulfate, graphite, calcium carbonate, metal oxides, silica powder, metal powder, etc.
④ Metallic fibers: Iron or nonferrous metals
⑤ Heat-resistant organic fibers: Aramid pulp
⑥ Glass fibers: Chopped strand glass fibers
⑦ Inorganic fibers: Silica-alumina-based fibers

EXAMPLE

In following, examples of the invention will be illustrated.

A mixture of materials shown in Table 1 mixed in proportions shown in the table, respectively, was homogenized in a stirrer. Then, this mixed material was thrown into a hot metal mold after temporarily pressed for several seconds at ordinary temperature with molding machine adjusted the areal pressure to 50 kgf/cm$^2$ or leaving it as it was. And, adjusting the temperature of metal mold to 150° to 160° C., the molding was carried out for 5 minutes under heat and pressure by the use of molding machine. Thereafter, the heat treatment was performed for 4 hours in an oven at temperature of 150°, 200°, or 250° C., respectively. After cooling, the molded product was polished to a fixed size to obtain the friction material for brake.

TABLE 1

| Raw material (wt. %) | Comparative material 1 | Inventive material 2 | Inventive material 3 | Inventive material 4 | Inventive material 5 | Inventive material 6 | Inventive material 7 | Conventional material 8 |
|---|---|---|---|---|---|---|---|---|
| Fibrillated acrylic fiber (freeness 260 ml) | 5 | — | — | — | — | — | — | — |
| Fibrillated acrylic fiber (freeness 320 ml) | — | 5 | — | — | — | — | — | — |
| Fibrillated acrylic fiber (freeness 450 ml) | — | — | 5 | — | — | — | — | — |
| Fibrillated acrylic fiber (freeness 490 ml) | — | — | — | 5 | — | 5 | 7 | — |
| Fibrillated acrylic fiber (freeness 550 ml) | — | — | — | — | 5 | — | — | — |
| Aramid pulp | — | — | — | — | — | 5 | 3 | 5 |
| Phenol resin | 15 | 15 | 15 | 15 | 15 | 15 | 15 | 15 |
| Cashew dust | 10 | 10 | 10 | 10 | 10 | 10 | 10 | 10 |
| Calcium carbonate | 57 | 57 | 57 | 57 | 57 | 51 | 51 | 57 |

TABLE 1-continued

| Raw material (wt. %) | Friction material No. | | | | | | | |
|---|---|---|---|---|---|---|---|---|
| | Comparative material 1 | Inventive material 2 | Inventive material 3 | Inventive material 4 | Inventive material 5 | Inventive material 6 | Inventive material 7 | Conventional material 8 |
| Graphite | 5 | 5 | 5 | 5 | 5 | 6 | 6 | 5 |
| Aluminum powder | 3 | 3 | 3 | 3 | 3 | 3 | 3 | 3 |
| Glass fiber | 5 | 5 | 5 | 5 | 5 | 5 | 5 | 5 |

The initial torque (BEF) as a function of number of braking times of brake was measured using the inventive material No. 3 and the conventional materil No. 8 sumitted to the heat treatment at 200° C. among these friction materials. The results are shown in FIG. 1, where the inventive material is expressed by solid line and the conventional material by dotted line.

As evident from FIG. 1, it can be seen that the initial torque peak is clearly appearing with the conventional material No. 8, whereas this peak is almost extinguished with the inventive material No. 3.

Figure 2:
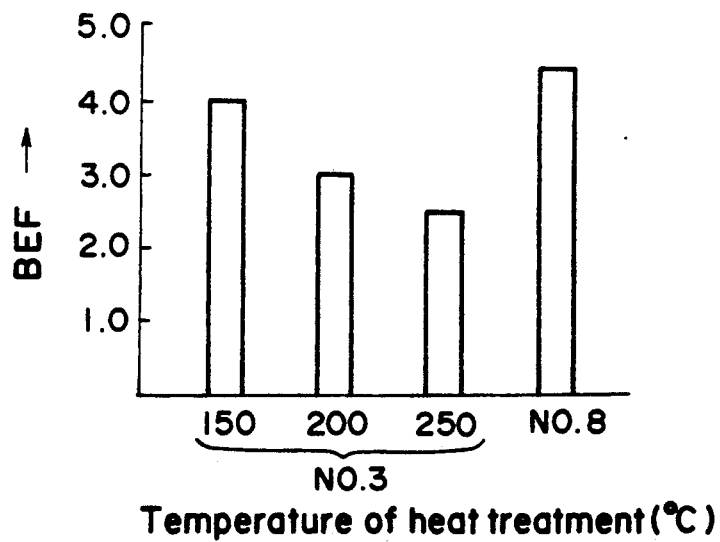
FIG. 2 is a measured diagram showing initial torque versus temperature of heat treatment if friction material.

Moreover, the results compared the magnitude of initial torque (BEF) between the inventive material No. 3 varied the temperature of heat treatment and the conventional material No. 8 submitted to the heat treatment at 200° C. are shown in FIG. 2.

From FIG. 2, it is seen that the magnitude of initial torque of the inventive materials is lower over that of the conventional material No. 8, but the higher the temperature of heat treatment, the lower the magnitude of initial torque.

Next, the generation rate of squeal noise of the inventive materials No. 4, No. 6 and No. 7 and the conventional material No. 8 submitted to the heat treatment at 200° C. was measured. Also, with respect to groan noise, the magnitude of noise was measured with them. The results are shown in FIG. 3 and FIG. 4, respectively.

Figure 3:
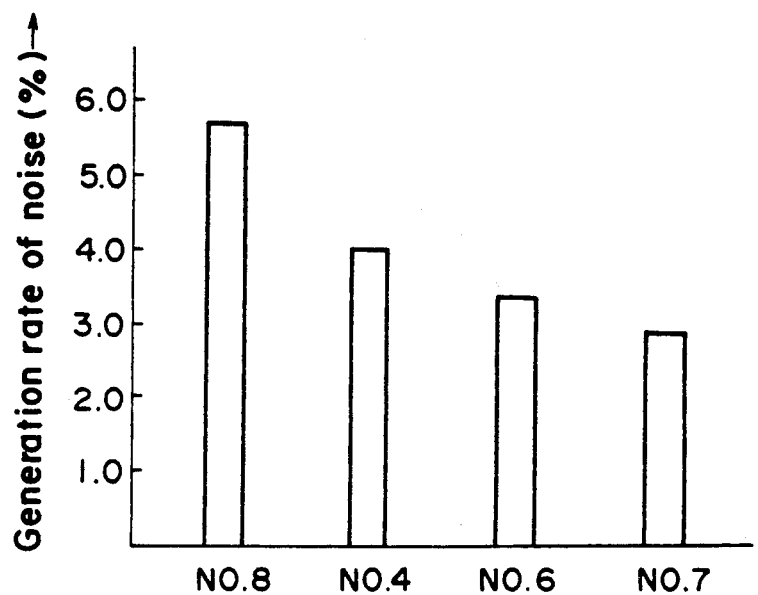
FIG. 3 is a measured diagram showing the generation rate of noise of friction materials.
Figure 4:
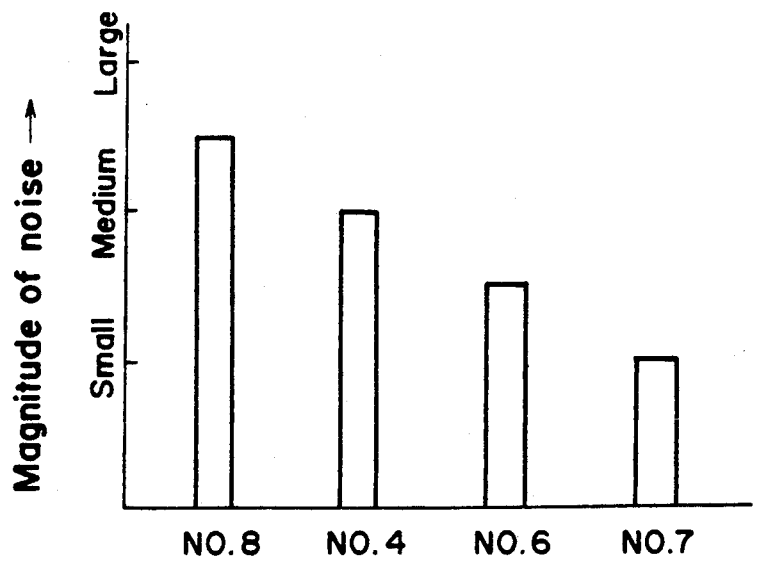
FIG. 4 is a measured diagram showing the magnitude of noise of friction materials.

It is evident from FIG. 3 and FIG. 4 that all of the inventive materials No. 4, No. 6 and No. 7 have decreased generation rate of noise over the conventional material No. 8.

Figure 5:
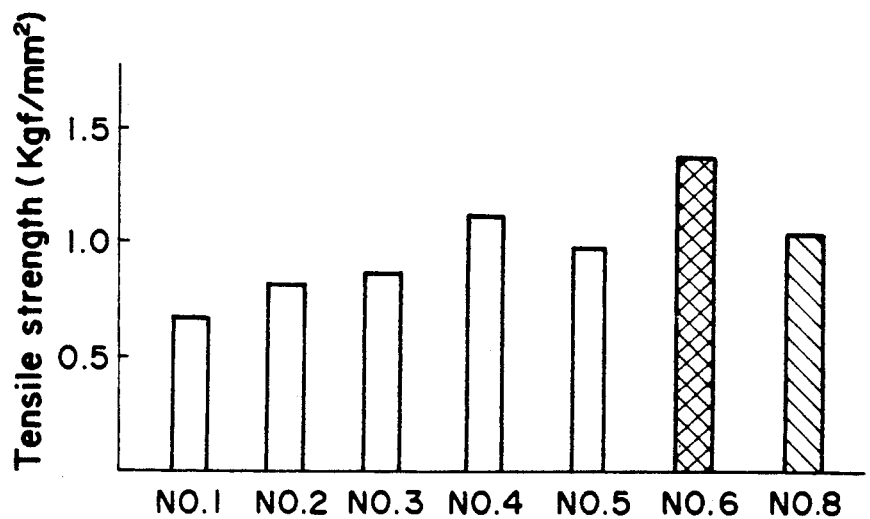
FIG. 5 is a measured diagram showing tensile strength of friction materials versus freeness of fibrillated acrylic fibers constituting the friction materials.

Further, the tensile strength of the inventive materials No. 2 through No. 6 and the conventional material No. 8 submitted to the heat treatment was measured, the values of which are shown in FIG. 5. Besides, the measurement value of tensile strength obtained with the comparative friction material No. 1 produced using fibrillated acrylic fibers having a freeness of 260 ml is also shown in FIG. 5.

From FIG. 5, it is seen that the materials solely containing fibrillated acrylic fibers have approximately equal tensile strength to that of the conventional friction material, and the inventive material No. 6 mixed fibrillated acrylic fibers with aramid pulp is superior to the conventional material also in the tensile strength.

Moreover, the tensile strength of the inventive material No. 4 submitted to the heat treatment at 200° C. was compared with that of the comparative friction material No. 9 which had the same composition as the material No. 4 and which was submitted to the preforming at an areal pressure of 250 kgf/cm$^2$ prior to the heat treatment. Results are shown in FIG. 6.

Figure 6:
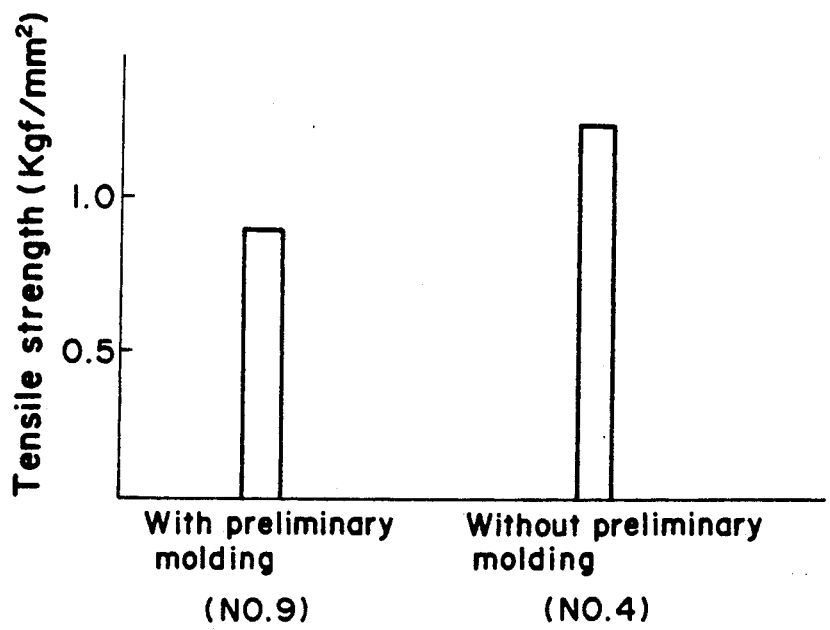
FIG. 6 is a measured diagram of tensile strength of the inventive friction material with preforming compared with that without it.

From FIG. 6, it is seen that, with the inventive friction materials, one without the preforming is better in the strength. This is because of that, if giving the preforming, the fibrillated acrylic fibers would orient in the right-angled direction to preforming pressure resulting in a decreased entanglement with other materials, but, if giving no preforming, the freedom of fibers would increase and the fluidity of other materials would also increase, thus increasing the entanglement.

As described above, in accordance with the invention, such remarkable effects can be exerted that the initial torque peak is extinguished to stabilize the efficiency, that the generation rate and the magnitude of noise also decrease, and the like.

What is claimed is:

1. A non-asbestos friction material comprising fibrillated acrylic fibers admixed with fibrous base materials selected from the group consisting of glass fibers, heat-resistant organic fibers, inorganic fibers and metallic fibers, said fibrillated acrylic fibers having a freeness (Canadian Standard Freeness) of at least 450 ml, a thermosetting resin and a friction modifier.

2. The non-asbestos friction material of claim 1, wherein the fibrous base material is heat-resistant organic fibers.

3. The non-asbestos friction material of claim 2, wherein the heat-resistant organic fiber is aramid pulp.

4. A method of producing non-asbestos friction material which comprises homogenizing in a stirrer a mixture of fibrillated acrylic fibers with fibrous base materials selected from the group consisting of glass fibers, heat-resistant organic fibers, inorganic fibers and metallic fibers, said fibrillated acrylic fibers having a freeness (Canadian Standard Freeness) of at least 450 ml, a thermosetting resin and a friction modifier, placing the homogenized mixture in a mold, molding for about 5 minutes under heat and pressure in said mold, adjusting the temperature of the mold to about 150° C.–160° C., subjecting the molded article to a heat treatment for about 4 hours at a temperature of from about 150° C. to about 250° C., and cooling and polishing the heat-treated molded article to a fixed size.

5. The method of claim 4, wherein the fibrous base material is heat-resistant organic fibers.

6. The method of claim 5, wherein the heat-resistant organic fiber is aramid pulp.

* * * * *